July 11, 1967
G. A. PETERSEN
3,330,055
RESILIENT RETAINING MEANS FOR JACKETED TOOTH
Filed Nov. 10, 1964
2 Sheets-Sheet 1
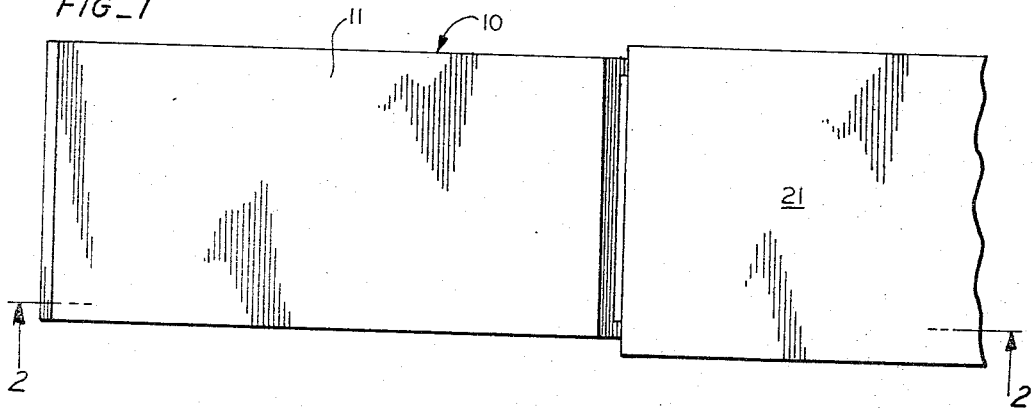
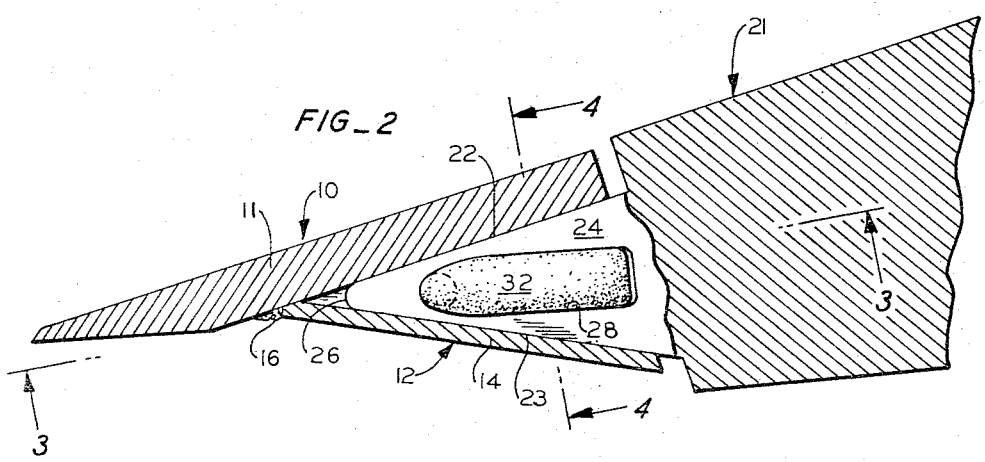
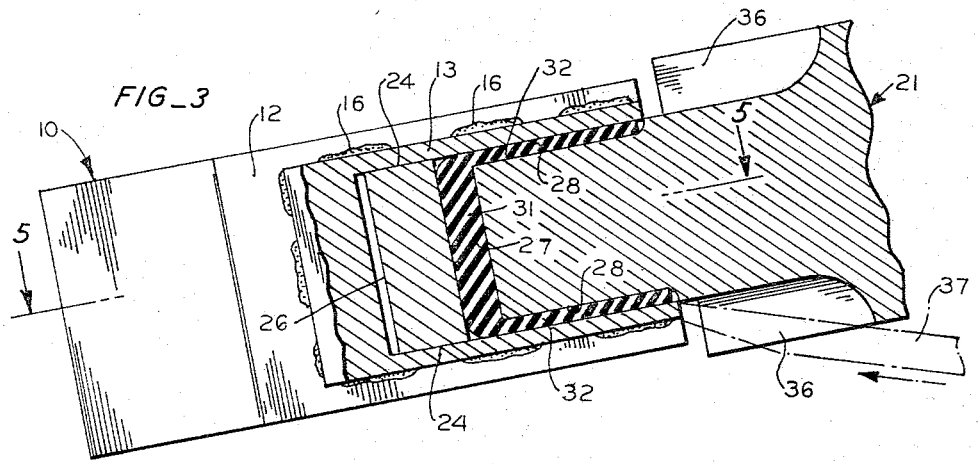
INVENTOR.
GERALD A. PETERSEN
BY
Julian Caplan
ATTORNEY July 11, 1967  G. A. PETERSEN  3,330,055
RESILIENT RETAINING MEANS FOR JACKETED TOOTH
Filed Nov. 10, 1964  2 Sheets-Sheet 2
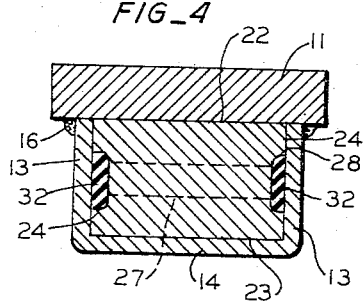
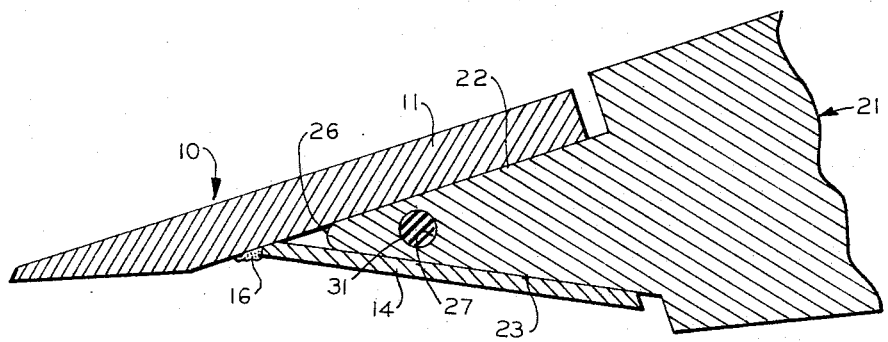
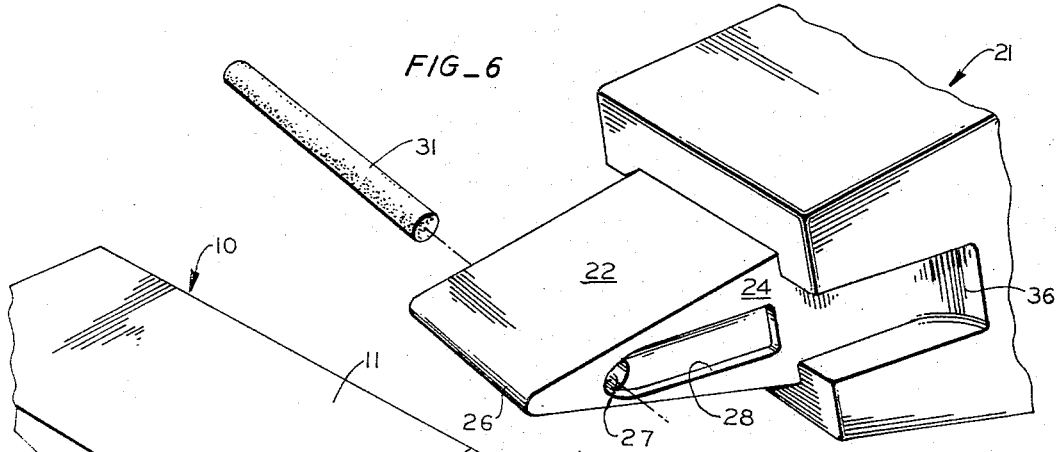
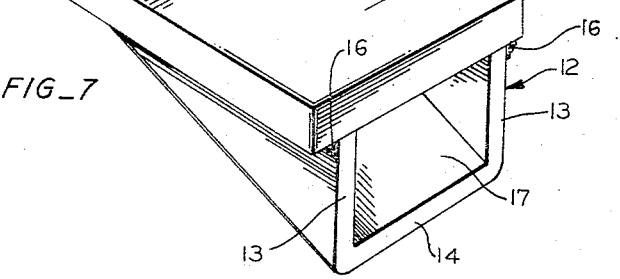
INVENTOR.
GERALD A. PETERSEN
BY
*Julian Caplan*
ATTORNEY

United States Patent Office 3,330,055
Patented July 11, 1967

3,330,055
RESILIENT RETAINING MEANS FOR JACKETED TOOTH
Gerald A. Petersen, Sunnyvale, Calif., assignor of one-half to Anita E. Petersen, Saratoga, Calif.
Filed Nov. 10, 1964, Ser. No. 410,224
2 Claims. (Cl. 37—142)

This invention relates to a new and improved resilient retaining means for jacketed tooth for earth-digging equipment. The present invention has particular application to replaceable teeth used in earth-digging equipment such as earth augers, trenching machines, and a wide variety of other digging tools.

Conventionally, replaceable earth-digging teeth are secured to a tooth holder or shank which is attached to or formed integrally with the digging equipment. The present invention comprises a new resilient means for retaining a widely used conventional type of tooth on its tooth holder.

The present means for retaining the jacketed tooth which is the subject of this invention on its holder is the provision of depressions in the shank, and the construction of at least a portion of the jacket of the tooth so that it may be deformed by a hammer or other tool to fit into the depression and hence restrain withdrawal of the tooth from its holder. The present invention eliminates some of the labor and difficulty occasioned in deforming the tooth jacket to install the tooth and in restoring the jacket to its initial shape in order to remove the tooth for replacement, sharpening, or the like.

Accordingly, a principal advantage of the present invention is the fact that the tooth jacket may be made of a material which is not readily deformable and hence has other advantages over the material conventionally used for such jacket.

A further feature of the invention is the provision of resilient means which accommodates variations in sizes of the mating parts without impairing the holding qualities of the retaining means.

Other objects of the present invention will become apparent upon reading the following specification and referring to the accompanying drawings in which similar characters of reference represent corresponding parts in each of the several views.

In the drawings:
FIG. 1 is a top plan view of the tooth and tool holder in accordance with this invnetion.
FIG. 2 is a sectional view taken substantially along the line 2—2 of FIG. 1.
FIG. 3 is a sectional view taken substantially along the line 3—3 of FIG. 2.
FIG. 4 is a sectional view taken substantially along the line 4—4 of FIG. 2.
FIG. 5 is a sectional view taken substantially along the line 5—5 of FIG. 3.
FIG. 6 is an exploded perspective view of a portion of a tooth holder and resilient retaining means.
FIG. 7 is a perspective view of a tooth in accordance with this invention.

The tooth 10 shown in the accompanying drawings is similar to that shown in Patent No. 2,124,230 and known commercially as the "H & L" tooth. Such tooth 10 has on its top surface a longitudinally extending thick, hard, tough blade or base 11 which extends the entire length of the tooth, and is generally rectangular in transverse cross-section. Depending from the rearward two-thirds of blade 11 is a jacket or cap 12 having substantially triangular sides 13 and an interconnecting bottom 14. Bottom 14 and the underside of blade 11 converge distally. The upper edges of sides 13 and the outer end of bottom 14 are welded or otherwise secured by means of weld 16 to the under-surface of blade 11. This construction povides a forwardly tapering socket 17 defined by the underside of blade 11, sides 13 and bottom 14. Although blade 11 is hard and tough, the sides 13 are conventionally somewhat thinner and more malleable, although this difference in the material of construction is not essential in the practice of the present invention.

As has previously been set forth, tooth 10 may be attached to an earth auger such as that shown in Petersen Patent No. 2,968,880, to a trenching machine, to a ripper tooth shank, to a dipper bucket, or to various other pieces of equipment used in earth-digging and boring. The details of construction of such equipment and of the attachment of the tooth holder 21 or shank thereto form no part of the present invention and are not herein illustrated or described in detail. However, it should be emphasized that the conditions of operation of such equipment produce severe stresses on tooth 10 and likewise upon the means for retaining the tooth on its holder 21.

As illustrated herein, a conventional tooth holder 21, partially illustrated herein, is formed integrally with or attached to the earth-digging equipment. The tooth holder 21 is formed with a top surface 22 which fits against the underside of blade 11, a bottom surface 23 which converges forwardly toward surface 22, and substantially perpendicular sides 24, which fit fairly snugly against the sides 13 of the tooth. The taper of surfaces 22, 23, is complementary to the convergence of the underside of blade 11 and bottom 14 and hence the forward end 26 of holder 21 is a blunt point which fits into a position adjacent the bottom of socket 17.

As a principal feature of the present invention, and as distinguishing the present invention from commercial embodiments of the tooth heretofore described, there is provided a hole 27 through the holder 21 spaced rearwardly of point 26 and approximately equidistant between surfaces 22, 23. Rearwardly of hole 27 in either of sides 24 is a groove 28. The depth of groove 28 is less than diameter 27. In a preferred embodiment of the invention herein illustrated and hereinafter described, groove 28 is of substantially lesser depth than the diameter of hole 27 and the width of groove 28 is substantially greater than the diameter of hole 27.

A resilient insert 31 is provided, the material of construction of which is subject to certain variation. The preferred material is neoprene synthetic rubber, but it will be understood that other resilient substances may be used, such as natural rubber, nylon cord, latex impregnated nylon cord, and soft iron wire. Initially, insert 31 is of a diameter approximately equal to that of hole 27 and of a length substantially greater than the distance between sides 24.

When the tooth is installed on the holder, as a preliminary step, insert 31 is inserted through hole 27 projecting outwardly on either side of the holder. As the tooth is pushed rearwardly, the exposed ends of insert 31 are forced backward and into the grooves 28. The backwardly bent portions 32 of resilient insert 31 are compressed and engage sides 13 of the jacket 12 and frictionally restrain withdrawal of the tooth from its holder. In the preferred embodiment illustrated and heretofore described, by reason of the shallow and wide shape of grooves 28, the portions 32 are deformed to the shape as shown in FIG. 4 and such deformation augments the surface area of portions 32 which frictionally engage sides 13 and thus function more effectively to frictionally restrain withdrawal.

When the tooth is thus forced into position as shown in FIG. 5 with surfaces 22 and 23 in engagement with the underside of blade 11 and the upper side of bottom 14 and with the portions 32 frictionally engaging sides 13, the tooth is securely held in position despite considerable stress. When it is necessary to remove the tooth for replacement or sharpening, a tool 37 may be inserted through the opening 36 in holder 21 which is intentionally formed for such purpose or other means may be used to pry the tooth from its holder.

It will be understood that although the hole 27 extends horizontally transversely through the holder 21 at its forward end, nevertheless the location of hole 27 is subject to a certain amount of variation.

It will further be understood that although a single insert 31 is illustrated herein, plural inserts may be used in situations where severe stresses are imposed or the size of the tooth is large. Such plural inserts may be installed in parallel horizontal displaced holes 27 and be squeezed into parallel longitudinal grooves in faces 24. Plural inserts may be located in various other locations either in holder 21 or in tooth 10.

What is claimed is:

1. In combination in an earth-digging tool, a tooth having a distal blade extending to the proximal end of said tooth and also having a socket-forming jacket at said proximal end, said jacket having substantially parallel triangular sides transverse to said blade and a sloping bottom interconnecting the lower edges of said sides and tapering distally toward said blade; a tooth holder having a forward portion shaped complementary to the socket defined by said jacket and the underside of said blade; and a resilient insert compressed between said forward portion and said tooth frictionally restraining dislodgement of said tooth from said holder, said forward portion formed with a transverse hole and said insert received in said hole and extending partially outside said hole and compressed against at least one side of said jacket, said forward portion formed with a groove rearward of said hole and said insert disposed partially in said groove, said groove having a depth substantially less and a width substantially greater than the initial, uncompressed thickness and width, respectively, of said insert.

2. In combination in an earth-digging tool, a tooth having a distal blade extending to the proximal end of said tooth and also having a socket-forming jacket at said proximal end, said jacket having substantially parallel triangular sides transverse to said blade and a sloping bottom interconnecting the lower edges of said sides and tapering distally toward said blade; a tooth holder having a forward portion shaped complementary to the socket defined by said jacket and the underside of said blade; said holder formed with a hole extending transversely therethrough and also formed on either side immediately rearward of said hole with a longitudinal groove; and a resilient insert extending through said hole and out either end thereof and into the adjacent groove, each end of said insert compressed between the bottom of a groove and the adjacent side of jacket to frictionally restrain dislodgement of said tooth from said holder, said groove having a depth substantially less and a width substantially greater than the initial, uncompressed thickness and width, respectively, of said insert.

References Cited
UNITED STATES PATENTS

| | | | |
|---|---|---|---|
| 2,852,874 | 9/1958 | Grubb | 37—142 |
| 2,968,880 | 1/1961 | Petersen | 37—142 |

ABRAHAM G. STONE, *Primary Examiner.*

A. E. KOPECKI, *Assistant Examiner.*